(12) United States Patent
Ozaki

(10) Patent No.: US 8,751,125 B2
(45) Date of Patent: Jun. 10, 2014

(54) VEHICLE CONTROL APPARATUS

(75) Inventor: Kazunori Ozaki, Atsugi (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 642 days.

(21) Appl. No.: 12/876,354

(22) Filed: Sep. 7, 2010

(65) Prior Publication Data

US 2011/0066342 A1    Mar. 17, 2011

(30) Foreign Application Priority Data

Sep. 17, 2009 (JP) ................................ 2009-215567

(51) Int. Cl.
*G06F 19/00* (2011.01)
*G06G 7/00* (2006.01)

(52) U.S. Cl.
USPC ............ 701/70; 701/48; 701/71; 701/73; 701/78; 701/79; 701/80; 701/83; 701/84; 701/85; 701/110

(58) Field of Classification Search
USPC ........... 701/48, 70, 71, 73, 78, 79, 80, 83, 84, 701/85, 110
See application file for complete search history.

(56) References Cited

U.S. PATENT DOCUMENTS

| | | | | |
|---|---|---|---|---|
| 5,128,869 A * | 7/1992 | Akishino et al. | ................. | 701/97 |
| 5,233,530 A * | 8/1993 | Shimada et al. | ............... | 701/107 |
| 5,749,063 A * | 5/1998 | Sakonjyu et al. | ............... | 701/93 |
| 5,758,848 A * | 6/1998 | Beule | ......................... | 246/182 B |
| 5,784,883 A * | 7/1998 | Ohkura et al. | ................... | 60/327 |
| 6,070,682 A * | 6/2000 | Isogai et al. | ................... | 180/167 |
| 7,016,777 B2 * | 3/2006 | Suzuki et al. | .................... | 701/70 |
| 7,319,927 B1 * | 1/2008 | Sun et al. | ........................ | 701/93 |
| 7,599,779 B2 * | 10/2009 | Watanabe et al. | ................. | 701/70 |
| 8,086,383 B2 * | 12/2011 | Takenaka et al. | ................. | 701/74 |
| 2004/0134698 A1 * | 7/2004 | Yamamoto et al. | ........... | 180/65.2 |
| 2005/0216162 A1 * | 9/2005 | Suzuki et al. | ..................... | 701/70 |
| 2006/0004507 A1 * | 1/2006 | Teslak et al. | ..................... | 701/69 |
| 2009/0043473 A1 * | 2/2009 | Nakai et al. | ...................... | 701/70 |
| 2009/0216415 A1 * | 8/2009 | Iwatsuki et al. | ................. | 701/70 |
| 2009/0248268 A1 * | 10/2009 | Shigeta et al. | ................... | 701/72 |
| 2010/0010717 A1 * | 1/2010 | Maeda | ............................ | 701/56 |
| 2010/0070151 A1 * | 3/2010 | Sonoda et al. | .................. | 701/96 |
| 2010/0250084 A1 * | 9/2010 | Takiguchi et al. | ............... | 701/70 |

FOREIGN PATENT DOCUMENTS

| JP | 10-329684 A | 12/1998 | | |
|---|---|---|---|---|
| JP | 10329684 A | * 12/1998 | ................ | B60T 8/32 |

* cited by examiner

*Primary Examiner* — Khoi Tran
*Assistant Examiner* — Jorge Peche
(74) *Attorney, Agent, or Firm* — Crowell & Moring LLP

(57) ABSTRACT

A vehicle control apparatus includes an accelerator-manipulated-amount detecting section configured to detect a manipulated amount of accelerator; a braking-force generating section configured to generate a braking force of the vehicle; a driving-force generating section configured to generate a driving force of the vehicle; a control unit including a vehicle-body speed calculating section configured to calculate an actual vehicle-body speed. The control unit is configured to perform a normal control mode which generates a driving force corresponding to the accelerator manipulated amount, and to perform a speed control mode which calculates a target vehicle-body speed based on the accelerator manipulated amount and which controls the braking-force generating section and the driving-force generating section so as to bring the actual vehicle-body speed closer to the target vehicle-body speed. The vehicle control apparatus further includes a selecting switch configured to select between the normal control mode and the speed control mode. The control unit is configured to control the vehicle by one selected between the normal control mode and the speed control mode by the selecting switch.

11 Claims, 10 Drawing Sheets

V2 < V3 < V4 < V5

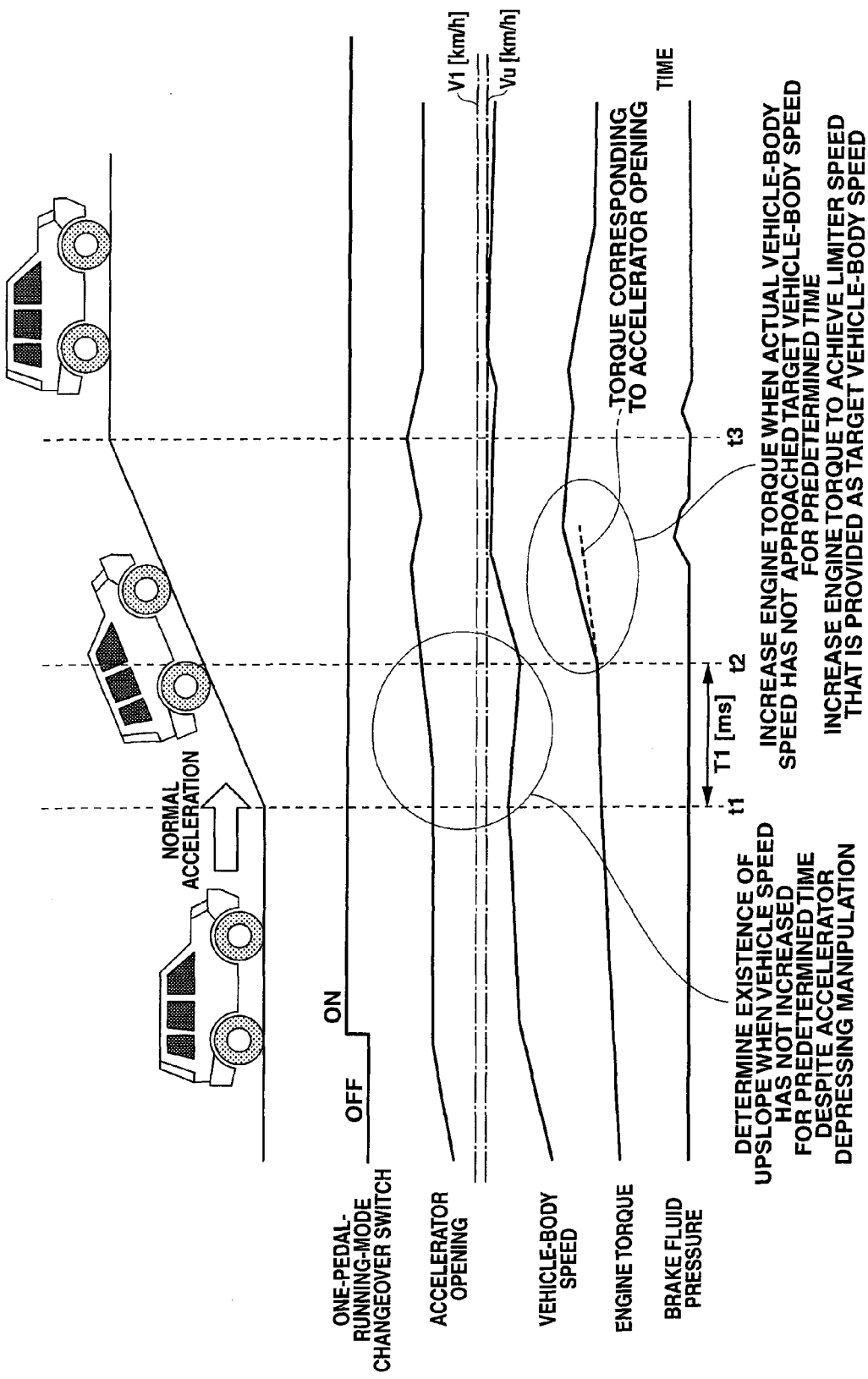

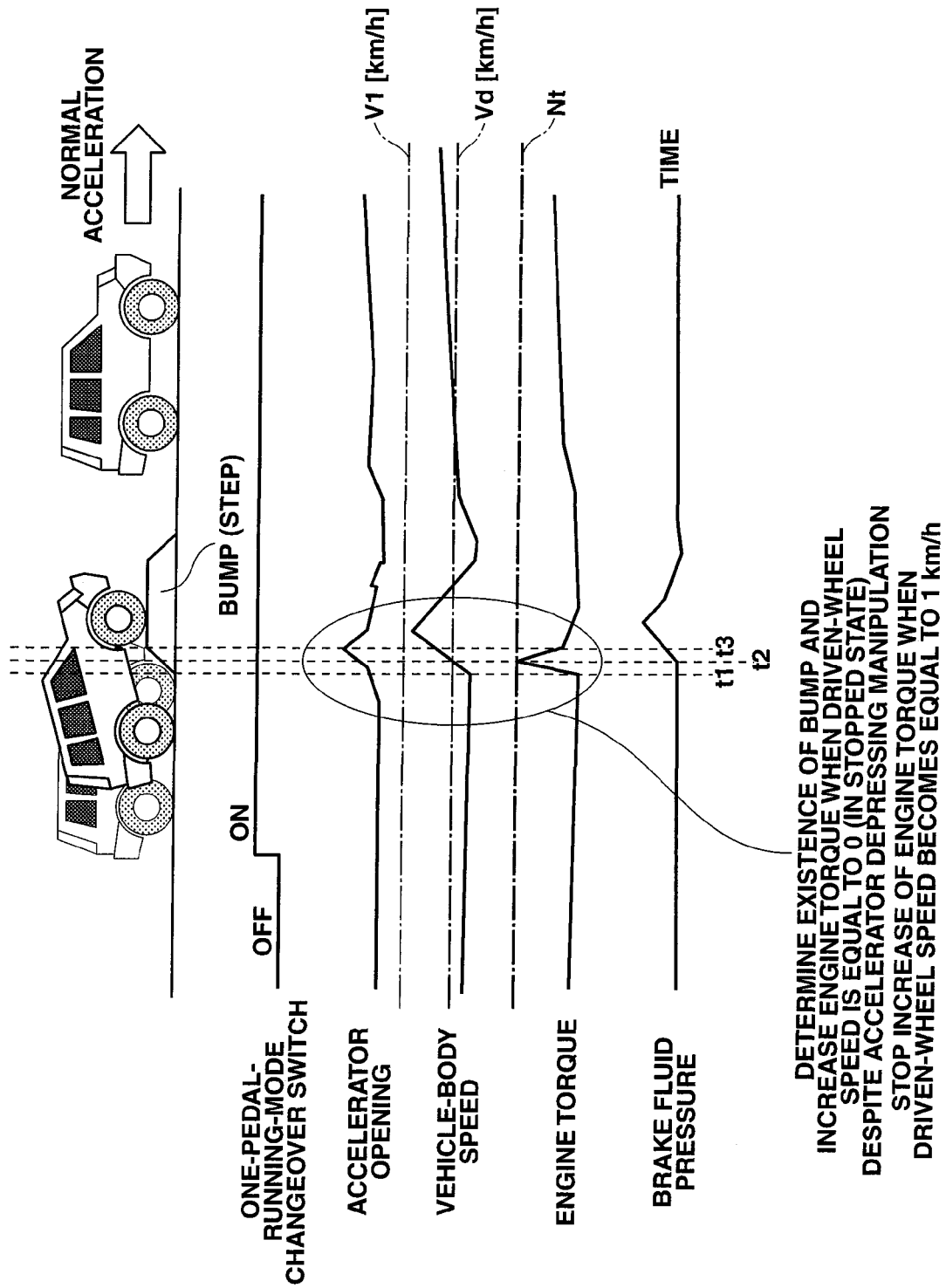

VEHICLE CONTROL APPARATUS

BACKGROUND OF THE INVENTION

The present invention relates to a vehicle control apparatus for controlling a running state of vehicle.

Previously, at a vehicle running in traffic jam, start, acceleration and stop of the vehicle have been conducted by accelerator and brake manipulations of a driver. Hence, there has been a problem that frequent changeovers between the both manipulations (changeover between brake-pedal depression and accelerator-pedal depression) are burdensome to the driver. Moreover, in a scene where a vehicle runs over a bump such as a step formed at an entrance of parking space when the vehicle is parked, the driver needs to switch between the accelerator manipulation and the brake manipulation more rapidly, resulting in a burden to the driver. Japanese Patent Application Publication No. 10-329684 discloses a previously-proposed technique. In this technique, a predetermined braking force based on a vehicle-body speed and a manipulated amount of accelerator pedal is outputted.

SUMMARY OF THE INVENTION

In the above-mentioned technique, a deceleration control is performed by selecting from small, medium and large braking-force values on the basis of the vehicle-body speed and the accelerator-pedal returned amount and by outputting the selected braking-force value, when the accelerator pedal is returned. However, since these braking-force values are predetermined values, there is a risk that the driver has a strangeness feeling due to a variation of vehicle weight or a gradient variation of road surface, even in the case of identical vehicle-body speed and identical accelerator-returning manipulation.

It is an object of the present invention to provide a vehicle control apparatus, devised to reduce the pedal-manipulation burden of driver without giving a strangeness feeling to the driver.

According to one aspect of the present invention, there is provided a vehicle control apparatus comprising: an accelerator-manipulated-amount detecting section configured to detect a manipulated amount of accelerator by a driver; a braking-force generating section configured to generate a braking force of the vehicle; a driving-force generating section configured to generate a driving force of the vehicle; a control unit including a vehicle-body speed calculating section configured to calculate an actual vehicle-body speed of the vehicle, the control unit being configured to perform a normal control mode which generates a driving force corresponding to the manipulated amount of accelerator, and to perform a speed control mode which calculates a target vehicle-body speed based on the manipulated amount of accelerator and which controls the braking-force generating section and the driving-force generating section so as to bring the actual vehicle-body speed closer to the target vehicle-body speed; and a selecting switch configured to select between the normal control mode and the speed control mode, wherein the control unit is configured to control the vehicle by one selected between the normal control mode and the speed control mode by the selecting switch.

According to another aspect of the present invention, there is provided a vehicle control apparatus comprising: an accelerator-manipulated-state detecting section configured to detect a manipulated state of accelerator by a driver; a deceleration unit configured to reduce a speed of the vehicle; and a control unit including a vehicle speed calculating section configured to calculate the speed of the vehicle, and a speed control section configured to set a target vehicle speed based on the detected accelerator manipulated state and the calculated vehicle speed, and configured to control the deceleration unit so as to bring the vehicle speed closer to the set target vehicle speed.

According to still another aspect of the present invention, there is provided a vehicle control method comprising: providing a selecting switch configured to select between a normal control mode and a speed control mode; setting a target vehicle-body speed on the basis of an acceleration/deceleration value corresponding to an accelerator manipulated amount of a driver; and controlling a braking/driving force of the vehicle so as to achieve the set target vehicle-body speed, when the driver is selecting the speed control mode.

The other objects and features of this invention will become understood from the following description with reference to the accompanying drawings.

BRIEF DESCRIPTION OF DRAWINGS

FIG. 11 is a time chart showing an operation at the time of upslope running in the one-pedal running mode according to the first embodiment.

FIG. 12 is a time chart showing an operation at the time of over-bump running in the one-pedal running mode according to the first embodiment.

DETAILED DESCRIPTION OF THE INVENTION

First Embodiment

Figure 1:
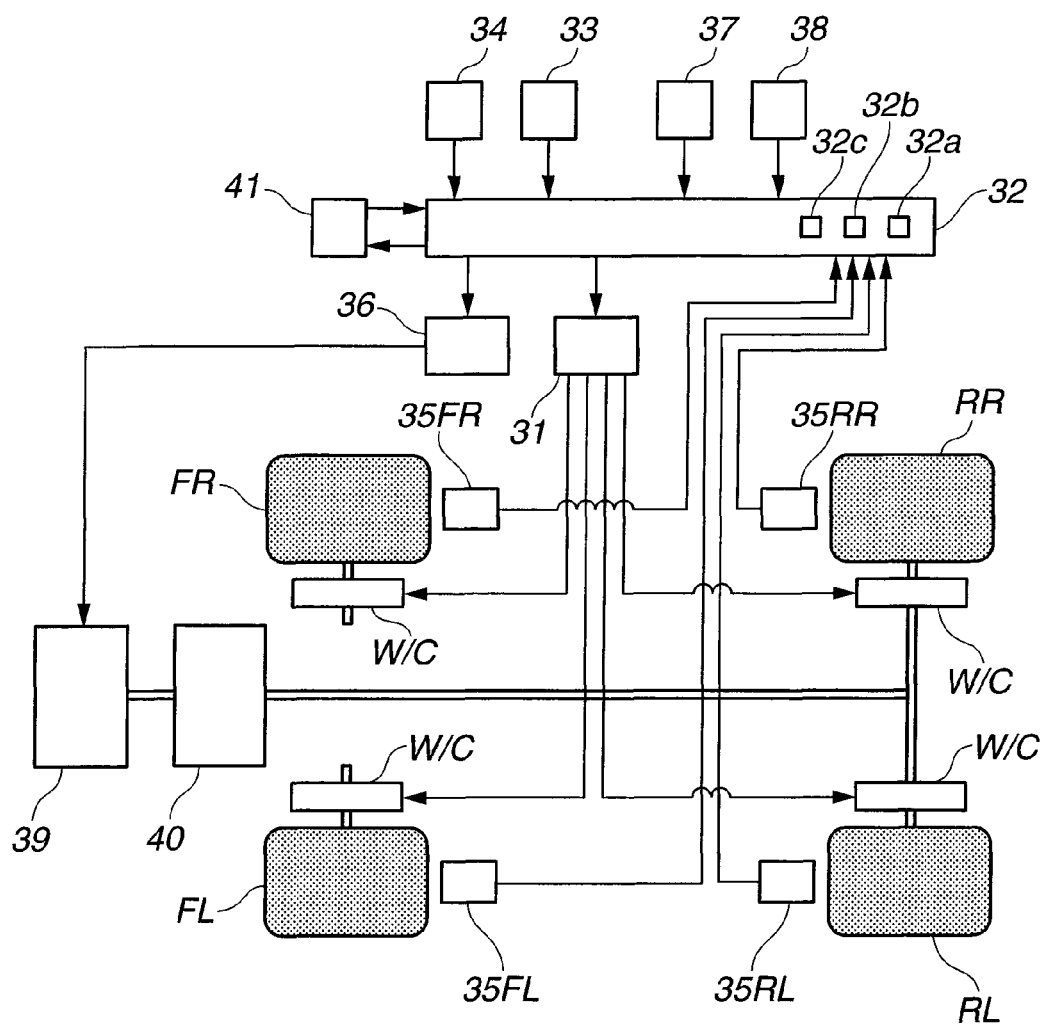
FIG. 1 is a schematic configuration view showing a braking/driving system of vehicle to which a vehicle control apparatus according to a first embodiment of the present invention has been applied.
Figure 2:
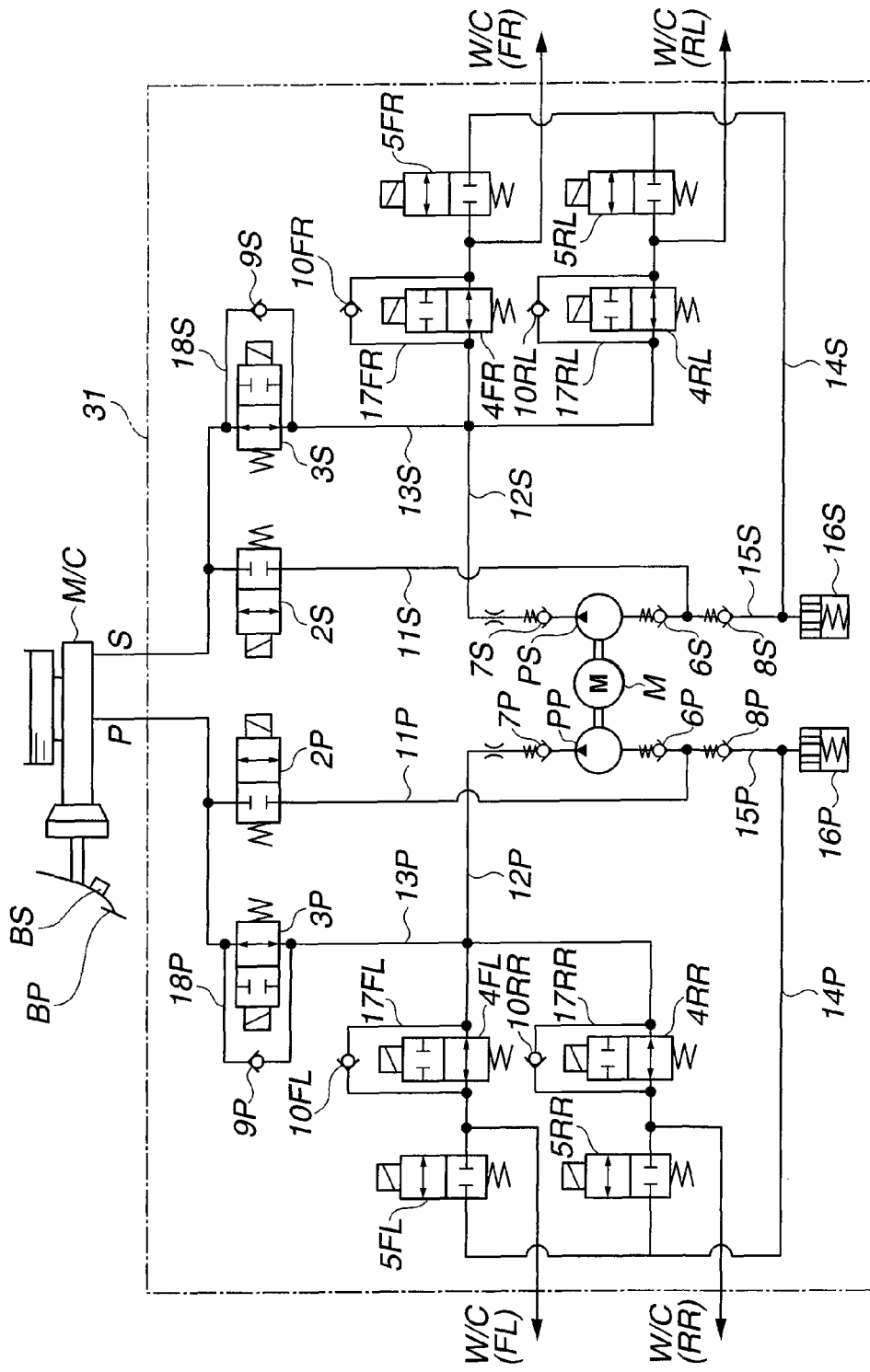
FIG. 2 is a hydraulic circuit diagram of a hydraulic unit according to the first embodiment.

At first, a configuration according to a first embodiment of the present invention will now be explained. FIG. 1 is a schematic configuration view showing a braking/driving system of vehicle to which a vehicle control apparatus according to the first embodiment has been applied. FIG. 2 is a schematic hydraulic (oil) circuit diagram of a hydraulic unit 31 according to the first embodiment. The vehicle according to the first embodiment includes an engine 39 as its drive source and a transmission 40, and is a vehicle of rear-wheel-drive type. That is, a driving force outputted from the engine 39 is inputted to the transmission 40 for appropriate speed change, and then drives rear right and rear left wheels RR and RL. However, according to the present invention, a front-wheel-drive vehicle or a four-wheel-drive vehicle can also be employed. Moreover, the hydraulic unit 31 is provided to construct a diagonal split layout of brake circuit having two pipe lines of a P-line and an S-line, that is sometimes termed "X-split piping".

A control unit 32 receives respective information derived from a combined sensor 33, a steering angle sensor 34 for detecting a steering state of driver, respective wheel-speed sensors 35FL, 35FR, 35RL and 35RR, an accelerator opening sensor 37 (accelerator-manipulated-amount detecting section or means) for detecting a manipulated amount (accelerator opening) of accelerator pedal by the driver, a brake switch 38 for detecting a manipulated amount of brake pedal by the driver, and a one-pedal-running-mode changeover switch (selecting switch) 41 for outputting an ON/OFF signal of aftermentioned one-pedal running mode. This one-pedal-running-mode changeover switch 41 is manipulated by the driver. The control unit 32 conducts various calculations based on such information, and outputs control commands to the hydraulic unit 31 and an engine controller 36.

The hydraulic unit 31 serves to maintain, increase or reduce respective fluid pressures of a wheel cylinder W/C (FL) of front-left wheel FL, a wheel cylinder W/C(RR) of rear-right wheel RR, a wheel cylinder W/C(FR) of front-right wheel FR and a wheel cylinder W/C(RL) of rear-left wheel RL, on the basis of commands derived from the control unit 32. In a normal time, the engine controller 36 controls an engine torque by controlling an fuel injection quantity of engine 39, a rotation speed of engine 39, a synchronizing timing of engine 39 and the like in accordance with the accelerator opening. That is, the engine 39 and the engine controller 36 constitutes an acceleration unit of the vehicle.

Each wheel cylinder W/C applies braking force to the corresponding road-wheel in accordance with a brake fluid supplied from the hydraulic unit 31. That is, the respective wheel cylinders W/C and the hydraulic unit 31 constitutes a deceleration unit of the vehicle. The combined sensor 33 is formed by packaging an acceleration sensor and a yaw rate sensor together, namely is a packed member of the acceleration sensor and yaw rate sensor. This acceleration sensor functions to sense an acceleration value (speed increasing rate) in a front-rear direction of the vehicle, and the yaw rate sensor functions to sense a yaw rate acting on the vehicle.

The P-line of the hydraulic unit 31 is connected with the front-left wheel cylinder W/C (FL) and the rear-right wheel cylinder W/C (RR). The S-line of the hydraulic unit 31 is connected with the front-right wheel cylinder W/C (FR) and the rear-left wheel cylinder W/C (RL). Moreover, a pump PP and a pump PS are provided respectively in the P-line and S-line, and are adapted to be driven by one motor M.

A master cylinder M/C is connected through a pipeline (conduit) 11P or 11S (hereinafter simply described as pipeline 11) with a suction side of the pump PP or PS (hereinafter simply described as pump P). On each pipeline 11, namely so as to cut across each pipeline 11, a gate in-valve 2P or 2S which is a normally-closed type electromagnetic valve is provided. On the pipeline 11, namely so as to cut across the pipeline 11, a check valve 6P or 6S (hereinafter simply described as check valve 6) is provided between the gate in-valve 2P or 2S (hereinafter simply described as gate in-valve 2) and the pump P. Each check valve 6 permits a flow of brake fluid in a direction toward the pump P from the gate in-valve 2, and prohibits a flow in the counter direction. A discharge side of the pump P is connected through a pipeline 12P or 12S (hereinafter simply described as pipeline 12) with the wheel cylinders W/C. On each pipeline 12, namely so as to cut across each pipeline 12, a solenoid in-valve 4FL, 4RR, 4FR, 4RL (hereinafter simply described as solenoid in-valve 4) is provided which is a normally-open type electromagnetic valve corresponding to each wheel cylinder W/C. Moreover, on the pipeline 12, a check valve 7P or 7S (hereinafter simply described as check valve 7) is provided between the pump P and the solenoid in-valve 4. Each check valve 7 permits a flow of brake fluid in a direction toward the solenoid in-valve 4 from the pump P, and prohibits a flow in the counter direction.

Moreover, on the pipeline 12, a pipeline 17FL, 17RR, 17FR, 17RL (hereinafter simply described as pipeline 17) is provided so as to make a detour around each solenoid in-valve 4. On the pipeline 17, namely so as to cut across the pipeline 17, a check valve 10FL, 10RR, 10FR, 10RL (hereinafter simply described as check valve 10) is provided. Each check valve 10 permits a flow of brake fluid in a direction toward the pump P from the wheel cylinder W/C, and prohibits a flow in the counter direction. The master cylinder M/C is connected through a pipeline 13P, 13S (hereinafter simply described as pipeline 13) with the pipeline 12. The pipeline 12 and the pipeline 13 flow into each other at a point between the pump P and the solenoid in-valve 4. On each pipeline 13, namely so as to cut across each pipeline 13, a gate out-valve 3P or 3S (hereinafter simply described as gate out-valve 3) which is a normally-open type electromagnetic valve is provided. Moreover, on the pipeline 13, a pipeline 18P, 18S (hereinafter simply described as pipeline 18) is provided so as to make a detour around each gate out-valve 3. On the pipeline 18, namely so as to cut across the pipeline 18, a check valve 9P, 9S (hereinafter simply described as check valve 9) is provided. Each check valve 9 permits a flow of brake fluid in a direction toward the wheel cylinder W/C from the master cylinder M/C, and prohibits a flow in the counter direction. On the suction side of the pump P, a reservoir 16P, 16S (hereinafter simply described as reservoir 16) is provided. The reservoir 16 is connected through a pipeline 15P, 15S (hereinafter simply described as pipeline 15) with the pump P. A check valve 8P, 8S (hereinafter simply described as check valve 8) is provided between the reservoir 16 and the pump P. Each check valve 8 permits a flow of brake fluid in a direction toward the pump P from the reservoir 16, and prohibits a flow in the counter direction. The wheel cylinder W/C is connected through a pipeline 14P, 14S (hereinafter simply described as pipeline 14) with the pipeline 15. The pipeline 14 and the pipeline 15 flow into each other at a point between the check valve 8 and the reservoir 16. On the pipeline 14, namely so as to cut across each pipeline 14, a solenoid out-valve 5FL, 5RR, 5FR, 5RL (hereinafter simply described as solenoid out-valve 5) which is a normally-closed type electromagnetic valve is provided. Each wheel-cylinder pressure can be increased and decreased by the opening/closing operations of these respective electromagnetic valves irrespective of the brake-pedal manipulation of the driver. Since a concrete pressure-increasing/decreasing process is generally known, explanations thereof will be omitted for a simplification of the disclosure.

The control unit 32 performs a calculation for a normal brake control that is executed to follow the driver's manipulation, on the basis of input signals of the respective sensors, a brake-pedal manipulating state of the driver and the like; and performs a calculation for a vehicle behavior control or tire slip control using information of the vehicle, such as an antiskid brake control (ABS), a vehicle behavior stabilization control (VDC), an adaptive cruise control and an obstacle avoidance control. Thereby, the control unit 32 calculates a braking force (for all the road-wheels) necessary as the vehicle, and calculates a target value of braking force necessary for each road-wheel, and then outputs command signals according to the respective target values of braking force. In the explanations for the present invention (i.e., in the specification of present application), such controls (the above-mentioned normal brake control, vehicle behavior control, tire slip control and the like) are collectively defined as a normal control mode. Moreover, the control unit 32 performs a one-pedal-running-mode control process (a speed control mode) for controlling the vehicle speed by automatically controlling the brake fluid pressure of each wheel cylinder W/C and/or automatically controlling the engine torque when the driver releases the accelerator pedal under a predetermined condition. Even during the one-pedal-running-mode control process, the vehicle behavior may be controlled by activating the antiskid brake control (ABS), the vehicle behavior stabilization control (VDC) or the like.

[Control Process of One-Pedal Running Mode]

Figure 3:
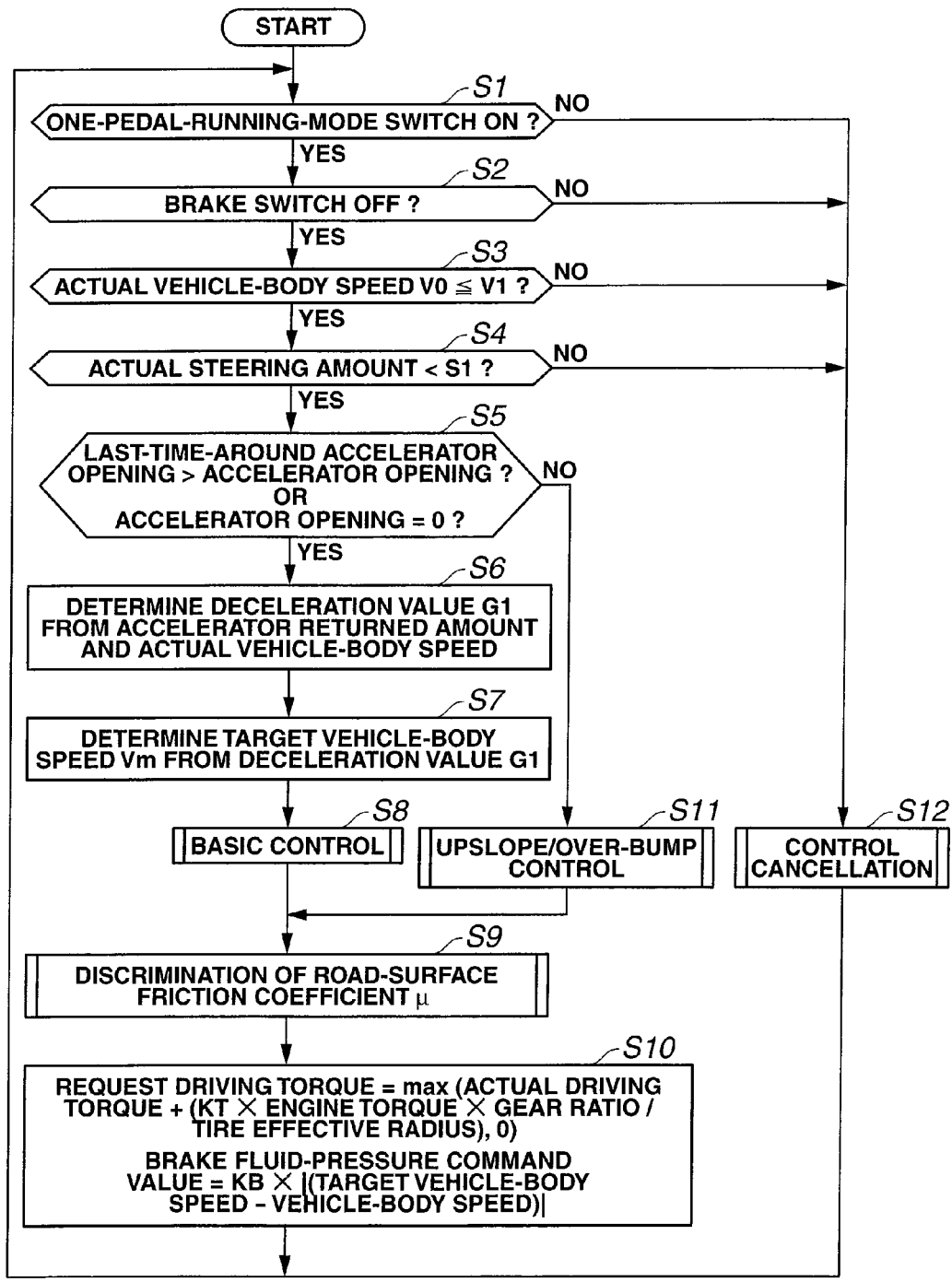
FIG. 3 is a flowchart showing a flow of one-pedal-running-mode control process that is executed in a control unit according to the first embodiment.

FIG. 3 is a flowchart showing a flow of the one-pedal-running-mode control process that is executed in the control unit 32 according to the first embodiment. Respective steps of FIG. 3 will now be explained. This control process is repeated at predetermined computing intervals. Moreover, the control unit 32 includes an actual vehicle-body speed calculating section 32a. An actual vehicle-body speed which is used in the control process flow is an average value of wheel speeds of the driven wheels FL and FR which are obtained from the wheel speed sensors 35FL and 35FR.

(Control Intervening Condition)

At step S1, the controller (control unit 32) judges whether or not the one-pedal-running-mode changeover switch 41 is in "ON" status. If YES at step S1, namely if the controller determines that the one-pedal-running-mode changeover switch 41 is in "ON"; the program proceeds to step S2. If NO at step S1, the program proceeds to step S12. Thus, at step S1, it is judged whether or not the driver has an intention of carrying out the one-pedal-running-mode control. When the one-pedal-running-mode changeover switch 41 is in "OFF" status, the normal control mode is performed.

At step S2, the controller judges whether or not the brake switch 38 is in "OFF" status. IF YES at step S2, namely if the controller determines that the brake switch 38 is in "OFF"; the program proceeds to step S3. If NO at step S2, the program proceeds to step S12. That is, when the driver manipulates the brake pedal, the one-pedal-running-mode control is immediately canceled or stopped and then is changed to the normal control mode. When the brake manipulation of driver is released, the one-pedal-running-mode control is carried out as long as the one-pedal-running-mode control is being selected.

At step S3, the controller judges whether or not the actual vehicle-body speed V0 is lower than or equal to a predetermined vehicle-body speed V1. IF YES at step S3, namely if the controller determines that the actual vehicle-body speed V0 is lower than or equal to the predetermined vehicle-body speed V1; the program proceeds to step S4. If NO at step S3, the program proceeds to step S12. The step S3 is given because the driver is considered to simply desire a coasting when the actual vehicle-body speed is high. On the other hand, a convenience (user-friendliness) is considered to be improved by a one-pedal manipulation of the one-pedal-running-mode control, when the actual vehicle-body speed is relatively low under a running state where start and stop of the vehicle are repeated, such as at the time of traffic-jam running.

At step S4, the controller judges whether or not an actual magnitude of steering angle is smaller than or equal to a predetermined value S1. If YES at step S4, namely if the controller determines that the actual steering angle is smaller than or equal to the predetermined value S1; the program proceeds to step S5. If NO at step S4, the program proceeds to step S12. Since a steering manipulation is done generally at the time of turning of the vehicle, the vehicle to which the steering manipulation is being applied is controlled by the driver's manipulation without the one-pedal-running-mode control, so that a strangeness feeling of the driver is suppressed.

(Control Contents)

At step S5, the controller judges whether or not a current-time-around value of accelerator opening (an accelerator-opening value during current control period) is smaller than a last-time-around value of accelerator opening (an accelerator-opening value during previous control period). Also, the controller judges whether or not the accelerator opening is equal to 0. If at least one of these two judgments is YES, namely the current accelerator-opening value is smaller than the previous accelerator-opening value or the accelerator opening is equal to 0; the program proceeds to step S6. If both of these two judgments are NO at step S5, the program proceeds to step S11. That is, a deceleration control is performed when the driver is during a returning manipulation of the accelerator pedal or has completely released the accelerator pedal. On the other hand, an upslope control or an over-bump control is performed when the driver is during a depressing manipulation of the accelerator pedal or the accelerator opening takes any constant value representing an "ON" status of the accelerator pedal.

Figure 4:
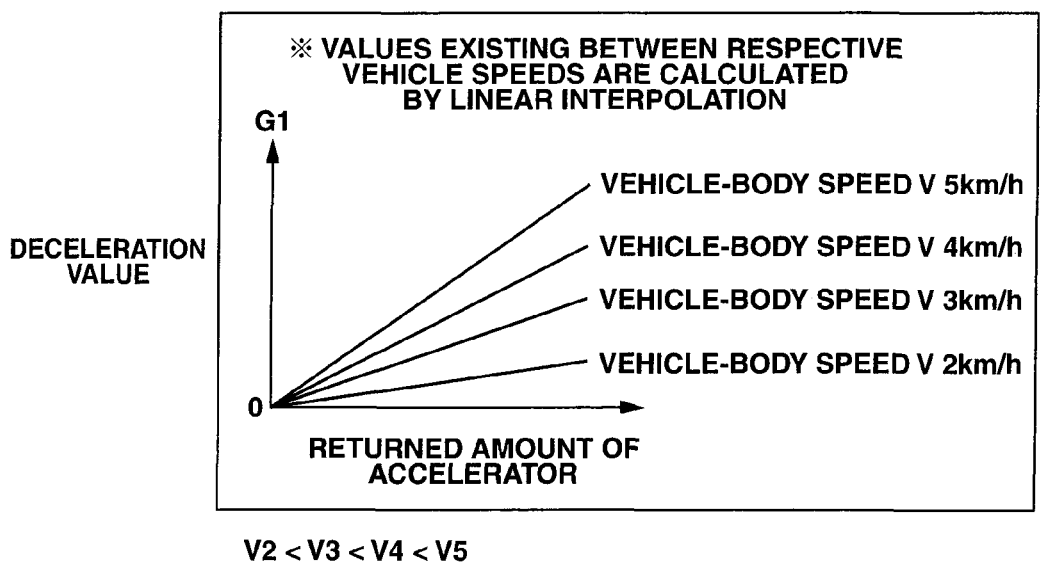
FIG. 4 is a map that is used for determining a target deceleration value in the first embodiment.

At step S6, the controller determines a deceleration value G1 in accordance with the actual vehicle-body speed and a returned amount of the accelerator pedal. FIG. 4 is a map that is used for determining the target deceleration value G1 in the first embodiment. The control unit 32 includes a target acceleration/deceleration-value calculating section 32c. The map as shown in FIG. 4 is provided in the target acceleration/deceleration-value calculating section 32c, and has a horizontal axis representing the returned amount of accelerator pedal (=accelerator) and a vertical axis representing the deceleration value G1 to be calculated. This accelerator returned amount means a variation amount of the accelerator manipulation per unit time, and is calculated by an accelerator-manipulation variation-amount calculating section 32b provided in the control unit 32. This map sets a deceleration-value characteristic every actual vehicle-body speed. The deceleration values G1 existing between the respective actual vehicle-body speeds of FIG. 4 are calculated by a linear interpolation. Thus, a larger deceleration-value is set as the accelerator returned amount becomes larger and as the actual vehicle-body speed becomes higher.

At step S7, the controller determines a target vehicle-body speed Vm from the target deceleration value G1 set at step S6. That is, since the target deceleration value G1 has been determined, the target vehicle-body speed Vm for a next-time-around control can be determined by using the actual vehicle-body speed as an initial value.

At step S8, the controller performs a basic control of the one-pedal-running-mode control. Details of this basic control will be explained later, separately.

At step S9, the controller performs a discrimination of road-surface friction coefficient (road-surface μ), and sets control gains of K1 to K6. Details of this discrimination process of road-surface friction coefficient will be explained later, separately.

At step S10, the controller calculates a request driving torque to the engine 39 and a brake fluid-pressure command value to the hydraulic unit 31. Specifically, these request driving torque and the brake fluid-pressure command value are calculated by the following formulas.

Request Driving Torque=max(Actual Driving Torque+
(*KT*×Engine Torque×Gear Ratio/Tire Effective
Radius),0)

Brake Fluid-pressure Command Value=*KB*×|(Target
Vehicle-body Speed−Actual Vehicle-body
Speed)|

Where, KT and KB denote control gains. Details of these gains KT and KB will be explained later.

At step S11, the controller performs the upslope/over-bump control. Details of the upslope/over-bump control will be explained later.

At step S12, the controller performs a control cancellation process. Details of the control cancellation process will be explained later.

(Basic Control Process)

Figure 5:
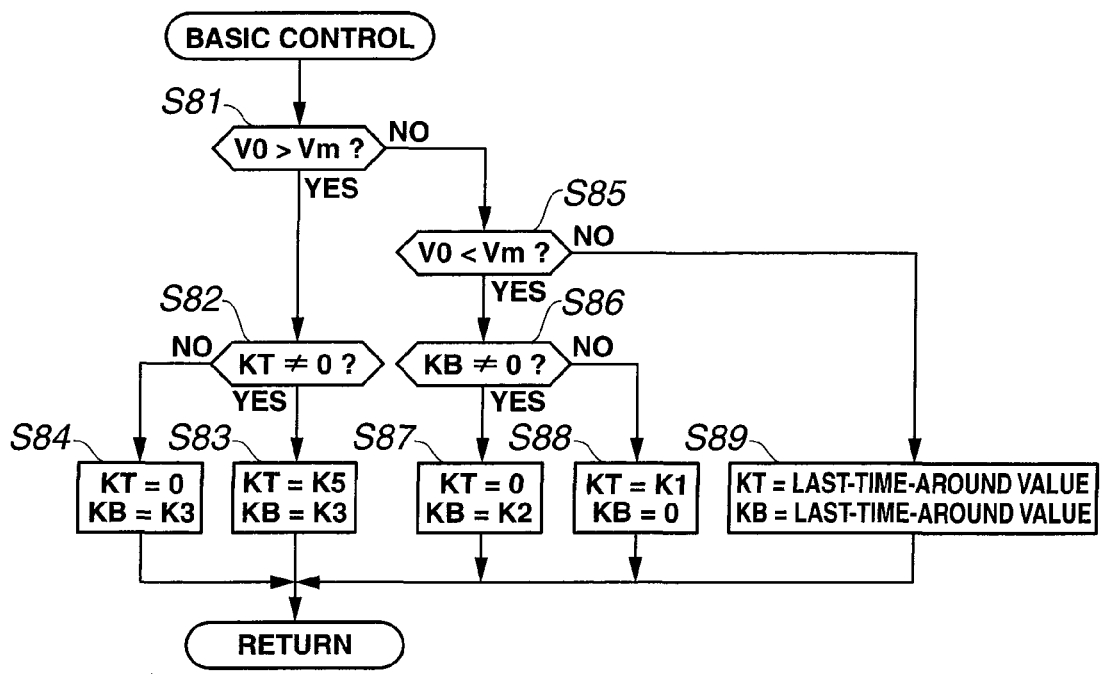
FIG. 5 is a flowchart showing a basic control in the one-pedal-running-mode control process according to the first embodiment.

Next, the basic control process which is executed at step S8 will now be explained. FIG. 5 is a flowchart showing the basic control in the one-pedal-running-mode control process according to the first embodiment.

At step S81, the controller judges whether or not the actual vehicle-body speed V0 is greater than the target vehicle-body speed Vm. If YES at step S81, namely if the controller determines that the actual vehicle-body speed V0 is greater than the target vehicle-body speed Vm; the program proceeds to step S82. If NO at step S81, the program proceeds to step S85.

At step S82, the controller judges whether or not the control gain KT is other than 0. If YES at step S82, namely if the controller determines that the control gain KT is other than 0; the program proceeds to step S83. If NO at step S82, namely in the case of KT=0; the program proceeds to step S84.

At step S83, the control gain KT is set at K5 (KT=K5), and the control gain KB is set at K3 (KB=K3).

At step S84, the control gain KT is set at 0 (KT=0), and the control gain KB is set at K3 (KB=K3).

At step S85, the controller judges whether or not the actual vehicle-body speed V0 is smaller than the target vehicle-body speed Vm. If YES at step S85, namely if the controller determines that the actual vehicle-body speed V0 is smaller than the target vehicle-body speed Vm; the program proceeds to step S86. If NO at step S85, namely in the case of Vm=V0; the program proceeds to step S89.

At step S86, the controller judges whether or not the control gain KB is other than 0. If YES at step S86, namely if the controller determines that the control gain KB is other than 0; the program proceeds to step S87. If NO at step S86, namely in the case of KB=0; the program proceeds to step S88.

At step S87, the control gain KB is set at K2 (KB=K2), and the control gain KT is set at 0 (KT=0).

At step S88, the control gain KB is set at 0 (KB=0), and the control gain KT is set at K1 (KT=K1).

At step S89, last-time-around values of the control gains KT and KB are maintained as it is (KT=Last-time-around Value, KB=Last-time-around Value). That is, the control gains KT and KB are not changed.

(Discrimination Process of Road-Surface Friction Coefficient)

Figure 6:
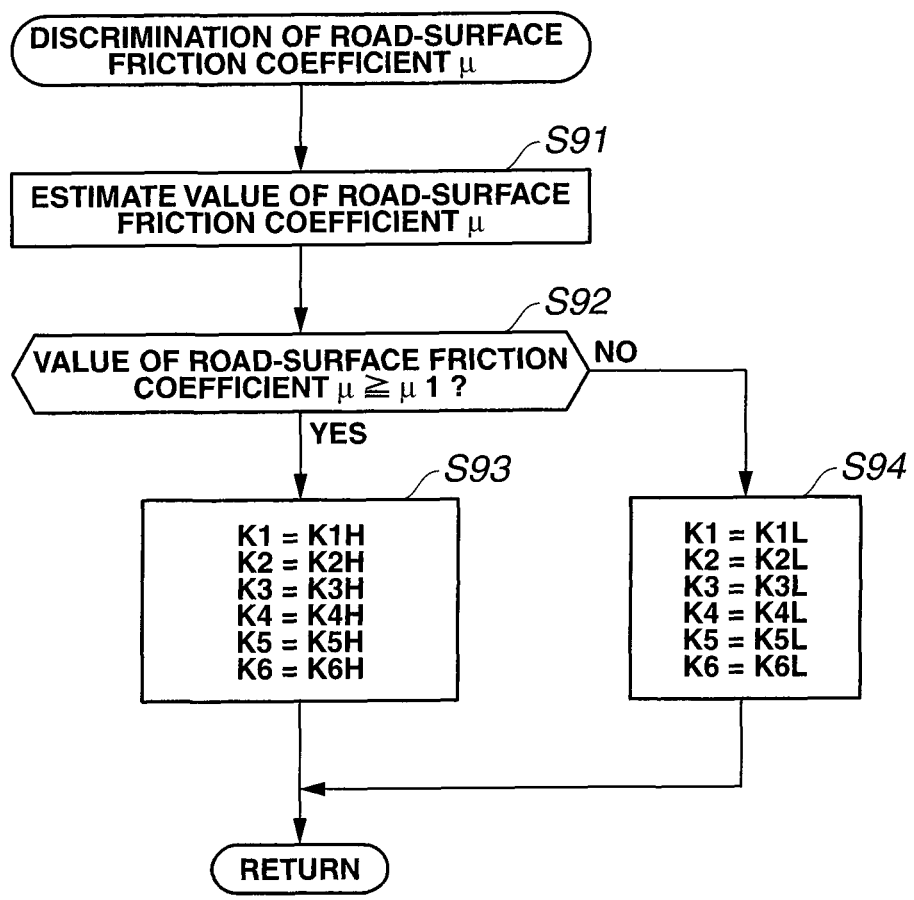
FIG. 6 is a flowchart showing a discrimination of road-surface friction coefficient in the one-pedal-running-mode control process according to the first embodiment.

Next, the discrimination process of road-surface friction coefficient which is executed at step S9 will now be explained. FIG. 6 is a flowchart showing the discrimination of road-surface friction coefficient in the one-pedal-running-mode control process according to the first embodiment.

At step S91, the controller estimates a value of the road-surface friction coefficient $\mu$. Specifically, the controller judges the road-surface friction coefficient $\mu$, for example, on the basis of the relation between a reduction rate (deceleration value) of the vehicle-body speed and the road-wheel speed. For example, the controller determines that the road-surface friction coefficient $\mu$ is low, in a case where the road-wheel speed tends to lock even though the reduction rate of vehicle-body speed is low. On the other hand, the controller determines that the road-surface friction coefficient $\mu$ is high, in a case where the road-wheel speed does not lock even though the reduction rate of vehicle-body speed is high. However, according to the present invention, a discrimination method of the road-surface friction coefficient $\mu$ is not limited to this, and can appropriately employ the other estimation logics and the like.

Figure 7:
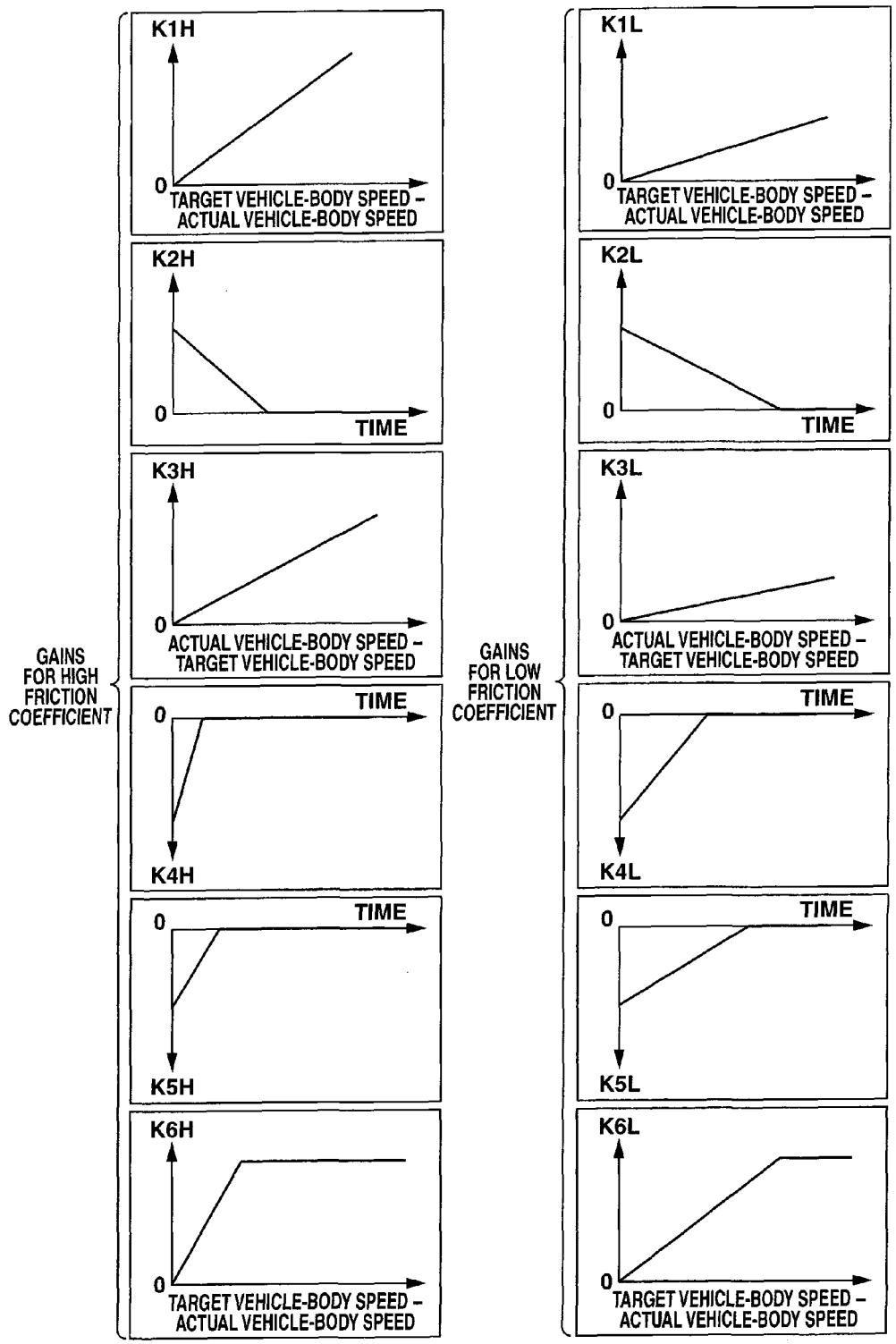
FIG. 7 is a gain map showing various gains according to the road-surface friction coefficient in the first embodiment.

At step S92, the controller determines that the road surface has a high friction coefficient when the road-surface friction coefficient $\mu$ is larger than or equal to $\mu 1$. Then, the program proceeds to step S93. At step S93, the control gains K1 to K6 are set to high-friction-coefficient gains K1H to K6H. When the road-surface friction coefficient $\mu$ is smaller than $\mu 1$ at step S92, the program proceeds to step S94. At step S94, the control gains K1 to K6 are set to low-friction-coefficient gains K1L to K6L. FIG. 7 is a gain map showing various gains according to the road-surface friction coefficient in the first embodiment.

The gain K1 is a value which is set as the control gain KT, and is set at a greater value as a difference between the target vehicle-body speed and the actual vehicle-body speed becomes greater. Moreover, this gain K1 is set at a greater value as the road-surface friction coefficient $\mu$ becomes higher.

The gain K2 is a value which is set as the control gain KB, and is set at a smaller value as an elapsed time becomes greater. Moreover, this gain K2 is reduced down to a certain small value in a shorter time as the road-surface friction coefficient $\mu$ becomes higher.

The gain K3 is a value which is set as the control gain KB, and is set at a greater value as the difference between the target vehicle-body speed and the actual vehicle-body speed becomes greater. Moreover, this gain K3 is set at a greater value as the road-surface friction coefficient $\mu$ becomes higher.

The gain K4 is a value which is set as the control gain KT, and is brought from a negative value closer to 0 as the elapsed time becomes greater. Moreover, this gain K4 is increased up to 0 in a shorter time as the road-surface friction coefficient $\mu$ becomes higher.

The gain K5 is a value which is set as the control gain KT, and is brought from a negative value closer to 0 as the elapsed time becomes greater. Moreover, this gain K5 has a variation gradient smaller than the gain K4, and is increased up to 0 in a shorter time as the road-surface friction coefficient $\mu$ becomes higher.

The gain K6 is a value which is set as the control gain KT, and is set at a greater value as the difference between the target vehicle-body speed and the actual vehicle-body speed becomes greater. In addition, the gain K6 is set at a constant value when the difference between the target vehicle-body speed and the actual vehicle-body speed is greater than or equal to a predetermined level. Moreover, this gain K6 is increased up to the constant value in a shorter time as the road-surface friction coefficient $\mu$ becomes higher. That is, in the case that the road-surface friction coefficient $\mu$ is relatively high, a grip force is secured so as to stabilize the vehicle even if large values are given to both of the driving force and the braking force (i.e., even if a large driving force and a large braking force are applied to the vehicle). On the other hand, in the case that the road-surface friction coefficient μ is relatively low, there is a risk that the grip force cannot be secured so that a reduction of vehicle stability is incurred. Therefore, in this embodiment, respective control amounts (controlled variables) are made to be small under the condition where the road-surface friction coefficient μ is relatively low.

(Upslope/Over-Bump Control Process)

Figure 8:
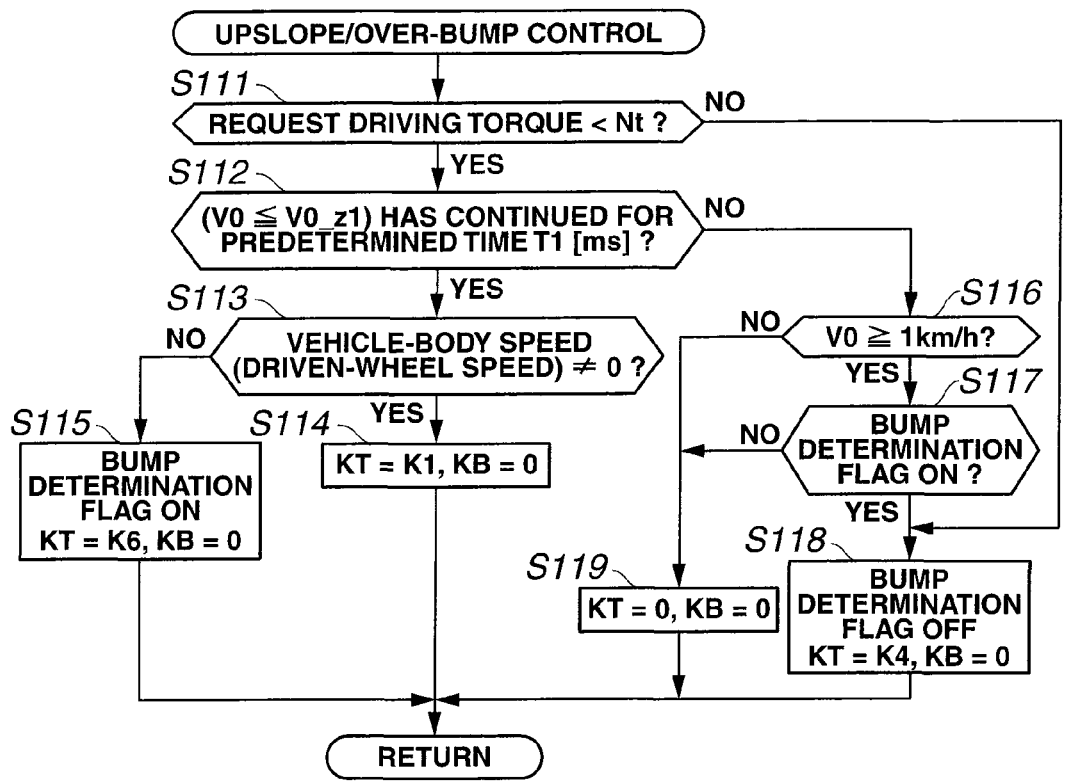
FIG. 8 is a flowchart showing an upslope/over-bump control process in the one-pedal-running-mode control process according to the first embodiment.

Next, the upslope/over-bump control process which is executed at step S11 will now be explained. FIG. 8 is a flowchart showing the upslope/over-bump control process in the one-pedal-running-mode control process according to the first embodiment.

At step S111, the controller judges whether or not the request driving torque is smaller than a predetermined value Nt. This predetermined value Nt is a threshold value above which the wheel of vehicle is considered to be in contact with a wheel choke (wheel stopper). If YES at step S111, namely if the request driving torque is smaller than the predetermined value Nt; the program proceeds to step S112. If NO at step S111, namely if the request driving torque is greater than or equal to the predetermined value Nt; the controller determines that the vehicle is being stopped by the wheel choke (wheel stopper), and the program proceeds to step S118.

At step S112, the controller judges whether or not a state where the (current) actual vehicle-body speed V0 is lower than or equal to a last-time-around actual vehicle-body speed V0_z1 (measured in the last-time-around control period) has continued for a predetermined duration time T1 (milliseconds). If YES at step S112, namely if the state where the actual vehicle-body speed V0 is lower than or equal to the last-time-around actual vehicle-body speed V0_z1 has continued for the predetermined duration time T1; the program proceeds to step S113. If NO at step S112, namely if the state where the actual vehicle-body speed V0 is lower than or equal to the last-time-around actual vehicle-body speed V0_z1 has not yet continued for the predetermined duration time T1; the program proceeds to step S116. That is, in a case that the vehicle speed is not increased even though the controller has determined that the driver is in the depressing manipulation of accelerator pedal or the accelerator opening is equal to any constant value representing the "ON" status of accelerator pedal at step S5, the controller determines that the vehicle is running on an upslope road or is in contact with a bump.

At step S113, the controller judges whether or not the actual vehicle-body speed is other than 0. If YES at step S113, namely if the actual vehicle-body speed is not equal to 0; the program proceeds to step S114. At step S114, the control gain KT is set to K1 (KT=K1), and the control gain KB is set at 0 (KB=0). On the other hand, if NO at step S113, namely if the actual vehicle-body speed is equal to 0; the program proceeds to step S115. At step S115, a bump determination flag is set to "ON". Also, at step S115, the control gain KT is set to K6 (KT=K6), and the control gain KB is set at 0 (KB=0).

At step S116, the controller judges whether or not the actual vehicle-body speed is higher than or equal to 1 km/h. If YES at step S116, namely if the actual vehicle-body speed is higher than or equal to 1 km/h; the controller determines that the vehicle has run over the bump (has passed over the bump), and then, the program proceeds to step S117. If NO at step S116, the program proceeds to step S119. At step S119, the control gains KT and KB are set at 0 (KT=0, KB=0). Although the speed value of 1 km/h is employed as a very low speed value in this example, the other very low speed values may be appropriately set instead of 1 km/h.

At step S117, the controller judges whether or not the bump determination flag is in "ON" status. If YES at step S117, the program proceeds to step S118. At step S118, the bump determination flag is set to "OFF". Also, at step S118, the control gain KT is set to K4 (KT=K4), and the control gain KB is set at 0 (KB=0).

(Control Cancellation Process)

Figure 9:
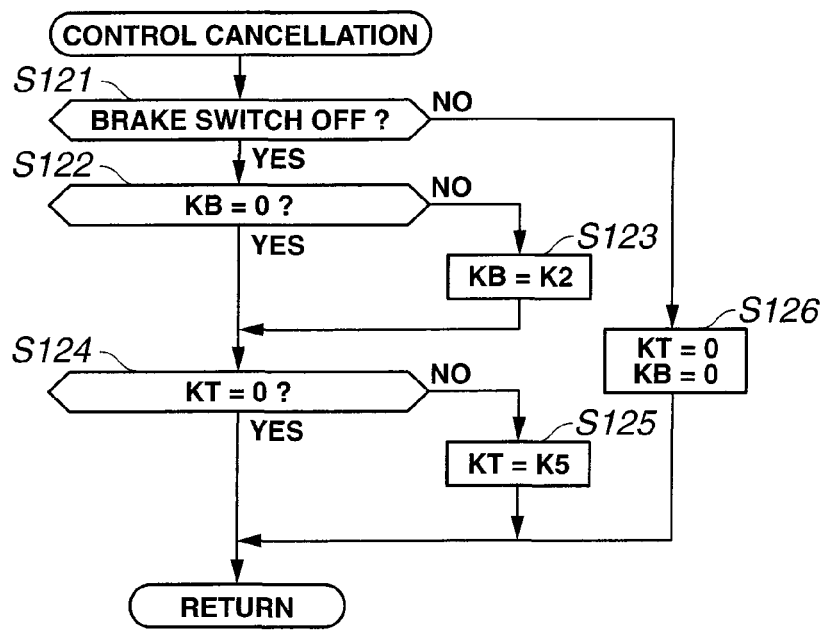
FIG. 9 is a flowchart showing a control cancellation process in the one-pedal-running-mode control process according to the first embodiment.

Next, the control cancellation process which is executed at step S12 will now be explained. FIG. 9 is a flowchart showing the control cancellation process in the one-pedal-running-mode control process according to the first embodiment.

At step S121, the controller judges whether or not the brake switch is in "OFF" status. IF YES at step S121, namely if the controller determines that the brake switch is in "OFF"; the program proceeds to step S122. If NO at step S121, the program proceeds to step S126. At step S126, the control gains KT and KB are set at 0 (KT=0, KB=0). That is, when the driver manipulates the brake pedal during the execution of one-pedal-running-mode control, the one-pedal-running-mode control is immediately finished.

At step S122, the controller judges whether or not the control gain KB is equal to 0. If YES at step S122, namely if the control gain KB is equal to 0, the program proceeds to step S124. If NO at step S122, the program proceeds to step S123. At step S123, the control gain KB is set to K2 (KB=K2). That is, when the control intervening condition becomes unsatisfied during the execution of brake fluid-pressure command outputted by the one-pedal-running-mode control, the one-pedal-running-mode control is gradually cancelled.

At step S124, the controller judges whether or not the control gain KT is equal to 0. If YES at step S124, namely if the control gain KT is equal to 0; this control flow is finished. If NO at step S124, the program proceeds to step S125. At step S125, the control gain KT is set to K5 (KT=K5). That is, when the control intervening condition becomes unsatisfied during the execution of engine torque command outputted by the one-pedal-running-mode control, the one-pedal-running-mode control is gradually cancelled.

[Operations in One-pedal Running Mode]

(Basic Action)

Figure 10:
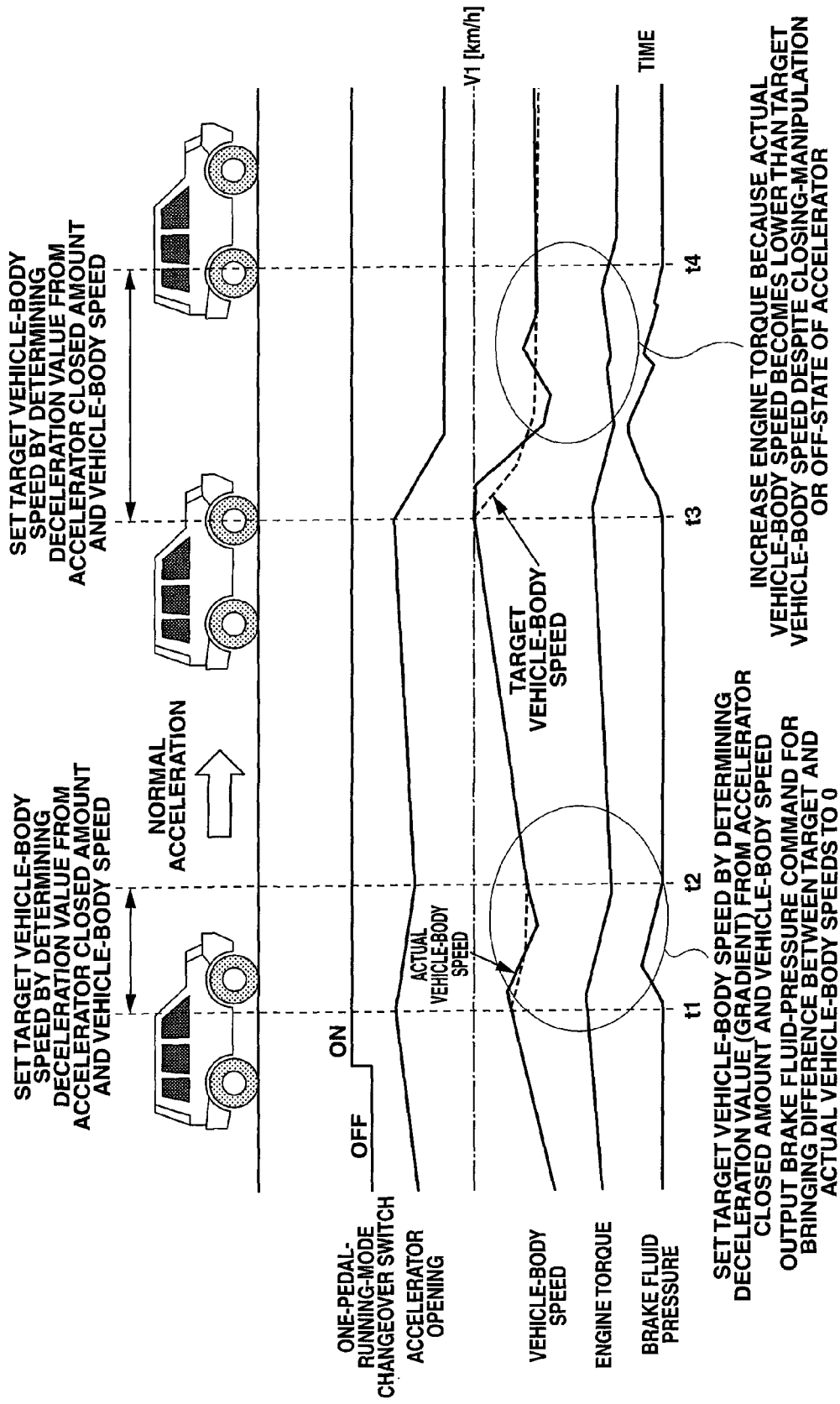
FIG. 10 is a time chart showing an operation in the one-pedal running mode according to the first embodiment.

FIG. 10 is a time chart showing an operation in the one-pedal running mode according to the first embodiment. FIG. 10 shows an action in a case that the vehicle runs straight on a flat road having a high road-surface friction coefficient without satisfying a cancellation condition of the speed control mode (one-pedal running mode), as an initial condition. At a time point t1, the driver starts to return the accelerator pedal under a state where the one-pedal-running-mode changeover switch 41 is "ON". At this time, the control intervening condition is satisfied since the vehicle-body speed is lower than the predetermined speed V1. The target deceleration value G1 (i.e., a gradient of the vehicle-body speed) is calculated from the amount of accelerator returning-manipulation of driver and the actual vehicle-body speed V0. Then, the target vehicle-body speed Vm is calculated from the actual vehicle-body speed V0 and the target deceleration value G1. Then, the difference between the actual vehicle-body speed V0 and the target vehicle-body speed Vm is calculated. So as to bring this difference to 0, braking force is generated by the brake fluid-pressure command. Thus, the driver can control the acceleration/deceleration of vehicle only by the accelerator manipulation. At a time point 2, the driver finishes the accelerator returning-manipulation and starts to depress the accelerator. At this time, the brake fluid pressure becomes equal to 0, and the vehicle is accelerated normally.

During an interval between time points t3 and t4 under the control of one-pedal running mode, when the actual vehicle-body speed V0 becomes lower than the target vehicle-body speed Vm under the state where the driver is in the returning manipulation of accelerator or has completely returned the accelerator, the control unit 32 outputs a control command to require a driving torque for bringing the difference between the actual vehicle-body speed V0 and the target vehicle-body speed Vm into 0, to the engine controller 36. Thus, the driver can control the vehicle to an optimal vehicle-body speed without frequently repeating the further-depressing manipulation of accelerator and the returning manipulation of accelerator. In other words, in the case that the one-pedal running mode is selected in the low vehicle-speed region, the driver can control the running state of vehicle in dependence upon the accelerator-pedal manipulation. Generally, in a case of the other normal controls, the vehicle cannot be stopped unless the brake pedal is depressed. Contrary to this, in the first embodiment; a quick braking is applied to the vehicle when the accelerator pedal is quickly released, and a slow braking is applied to the vehicle when the accelerator pedal is slowly released. Therefore, the control according to the first embodiment is advantageous particularly in a running state where the driver bears a large burden in manipulation such as the state of traffic-jam running. Moreover, by virtue of the setting of target vehicle-body speed Vm, a stable running state of vehicle can be attained without being influenced by magnitudes of a road-surface inclination and/or a vehicle weight. Furthermore, in other words, the control of vehicle-body speed means a control of movement distance of vehicle per unit time. This is definitely different from a structure in which the vehicle is controlled by simply setting a deceleration value of vehicle.

(Upslope Running)

FIG. 11 is a time chart showing an operation at the time of upslope running in the one-pedal running mode according to the first embodiment. FIG. 11 shows an action in a case that the vehicle runs straight on a flat road having a high road-surface friction coefficient without satisfying the cancellation condition of the speed control mode, as an initial condition. At a time point t1, the vehicle starts to run on an upslope road, and the driver additionally depresses the accelerator pedal in order to maintain the vehicle-body speed. At this time, the request driving force is lower than the predetermined value Nt which is a threshold value for determining that the vehicle is in contact with a wheel choke (wheel stopper). Then, at a time point t2, the actual vehicle-body speed has continued to decrease for the predetermined duration time T1 given between the time point t1 and the time point t2. Hence, the control unit 32 determines that the vehicle is running on the upslope road. Since the actual vehicle-body speed V0 is not equal to 0, the control gain KT is set to K1 and the control gain KB is set at 0. In order to concretely set the control gain KT, the difference between the target vehicle-body speed Vm and the actual vehicle-body speed V0 is necessary as shown in FIG. 7. At this time, the target vehicle-body speed Vm is set at a predetermined vehicle-body speed Vu which is lower than the predetermined vehicle-body speed V1. Based on the difference between this target vehicle-body speed Vm (=Vu) and the actual vehicle-body speed V0, the control gain KT is set. Then, the engine torque is increased so as to cause the difference between the target vehicle-body speed Vm (=Vu) and the actual vehicle-body speed V0 to become equal to 0. Accordingly, an engine torque level obtained by adding some torque to an engine torque level according to the accelerator opening is outputted, so that the vehicle can smoothly run on the upslope road without excessive accelerator-pedal manipulations of the driver.

When the actual vehicle-body speed V0 has reached the target vehicle-body speed Vm (=Vu), the vehicle is controlled so as to maintain the target vehicle-body speed by appropriately reducing the engine torque and by generating an appropriate brake fluid pressure. At a time point t3 at which the vehicle finishes ascending the upslope road, the driver manipulates the accelerator pedal gradually in its releasing (closing) direction. At this time, because the target vehicle-body speed Vu has already been set, the engine torque and the brake fluid pressure are appropriately controlled to maintain the target vehicle-body speed Vu. Thus, a vehicle running at a constant vehicle speed can be achieved while reducing the burden of driver in pedal manipulation.

For example, an upslope road of express highway is a site that frequently causes the traffic jam during a travel on the express highway. This is because the vehicle-body speed is naturally reduced to shorten an inter-vehicle distance from a rearward vehicle even if the driver keeps the accelerator-pedal opening constant, and hence, a driver of the rearward vehicle reduces its speed by looking at that the shortening of inter-vehicle distance, and then, this phenomenon occurs in a chain reaction. In such a case, according to the first embodiment of the present invention, when the vehicle-body speed is reduced under the state where the accelerator-pedal opening is constant, a torque-up assist for maintaining the vehicle-body speed is applied to the vehicle. Therefore, according to the first embodiment, an unintended reduction of vehicle-body speed can be avoided so that the traffic jam can be alleviated. Moreover, the configuration according to the first embodiment effectively functions, also for example, in a case that a multistory parking space or the like is crowded with vehicles, in addition to the scene of traffic jam at upslope road.

(Over-Bump Running)

FIG. 12 is a time chart showing an operation at the time of over-bump running in the one-pedal running mode according to the first embodiment. FIG. 12 shows an action in a case that the vehicle runs straight on a flat road having a high road-surface friction coefficient without satisfying the cancellation condition of the speed control mode, as an initial condition. At a time point t1, the vehicle reaches a bump (step portion) or hits the bump, and the driver depresses the accelerator pedal in order to increase the engine torque. At this time, if the actual vehicle-body speed V0 is not increased under the state where the request driving torque is smaller than the predetermined value Nt for determining whether or not the vehicle is in contact with a wheel choke (wheel stopper), it is determined that the vehicle is in contact with the bump. Hence, the bump determination flag is set to "ON", and the control gain KT is set to K6 (KT=K6) and the control gain KB is set at 0 (KB=0). In order to concretely set the control gain KT, the difference between the target vehicle-body speed Vm and the actual vehicle-body speed V0 is necessary as shown in FIG. 7. At this time, the target vehicle-body speed Vm is set at a predetermined value Vd (for example, 1 km/h) which represents the very low speed. Based on the difference between this target vehicle-body speed Vm (=Vd) and the actual vehicle-body speed V0, the control gain KT (=K6) is calculated. Since this control gain K6 is larger than the control gain K1, the greater torque-up is applied to the vehicle as compared with the case of control gain K1 until the vehicle starts to move. When the vehicle starts to ride upon (run over) the bump, the actual vehicle-body speed is increased from 0.

Accordingly, the control gain KT is changed from K6 to K1, and a vehicle-speed control similar as the basic control is carried out. At a time point t2, the actual vehicle-body speed V0 reaches the predetermined value Vd under the state where the bump determination flag is "ON", the control gain KT is changed from K1 to K4. This control gain K4 is a negative value for sharply reducing the engine torque to suppress an acceleration of vehicle which occurs immediately after the vehicle is made to ride upon the bump. At a time point t3, if the actual vehicle-body speed V0 becomes higher than the predetermined value Vd even though the engine torque is decreasing, the vehicle-body speed is controlled to become equal to the predetermined value Vd by generating the brake fluid pressure.

For example, a scene that the driver tries to run (pass) over a step portion and to park the vehicle in a parking space having the step portion or the like will now be considered as follows. Generally, the driver needs to depress the accelerator pedal by a large amount in order to run over the step portion. If the driver excessively depresses the accelerator pedal; the vehicle can run over the step portion, and however, an unintended vehicle movement is incurred after the run-over of step portion. This gives the driver an uncomfortable feeling. Contrary to this, according to the first embodiment of the present invention, the driver does not need to depress the accelerator pedal by a large amount. Also, the driver does not need to move his foot from the accelerator pedal to the brake pedal in order to depress the brake pedal in a hurry after running over the bump. That is, the vehicle is controlled so as to prevent the unintended vehicle forward-running immediately after the bump, without the abrupt suppressing manipulation of brake pedal by the driver. Therefore, according to the first embodiment of the present invention, both of a psychological burden and a physical burden of the driver can be reduced.

According to the first embodiment of the present invention, the following listed advantageous effects can be obtained.

① The vehicle control apparatus according to the first embodiment includes the accelerator opening sensor 37 (accelerator-manipulated-amount detecting section) configured to detect the manipulated amount of accelerator by a driver; the hydraulic unit 31 and the wheel cylinder W/C (braking-force generating section) configured to generate a braking force of the vehicle; the engine controller 36 and the engine 39 (driving-force generating section) configured to generate a driving force of the vehicle; and the control unit 32 including the actual vehicle-body speed calculating section 32a (vehicle-body speed calculating section) configured to calculate the actual vehicle-body speed of vehicle. The control unit 32 is configured to perform the normal control mode which generates a driving force corresponding to the manipulated amount of accelerator detected by the accelerator opening sensor 37, and configured to perform the speed control mode which calculates the target vehicle-body speed Vm based on the detected manipulated amount of accelerator and which controls the hydraulic unit 31 and the driving-force generating section so as to bring the actual vehicle-body speed V0 close to the set target vehicle-body speed Vm (i.e., so as to cause the actual vehicle-body speed V0 to follow the target vehicle-body speed Vm). The vehicle control apparatus further includes the one-pedal-running-mode changeover switch 41 (selecting switch) configured to select between the normal control mode and the speed control mode. Thereby, the control unit 32 controls the vehicle by one selected between the normal control mode and the speed control mode by the one-pedal-running-mode changeover switch 41. Therefore, the vehicle control reflecting the driver's intention can be attained. When the speed control mode is being selected, the vehicle speed can be controlled only by the accelerator manipulation so that the driving-manipulation burden of driver can be reduced. Moreover, since the vehicle-body speed is a controlled object (controlled variable), a stable running state can be achieved without being influenced by external changing factors such as the vehicle weight and the road-surface inclination.

② In the vehicle control apparatus mentioned in the above configuration ①, the control unit 32 further includes the accelerator-manipulation variation-amount calculating section 32b configured to calculate a variation amount of accelerator manipulation per unit time on the basis of the accelerator manipulated amount detected by the accelerator opening sensor 37, and the target acceleration/deceleration-value calculating section 32c configured to calculate the target acceleration/deceleration value G1 on the basis of the calculated accelerator-manipulation variation amount and the calculated actual vehicle-body speed V0. The control unit 32 is configured to calculate the target vehicle-body speed Vm from the calculated target acceleration/deceleration value G1, and to bring the actual vehicle-body speed V0 closer to the calculated target vehicle-body speed Vm. Thus, the actual vehicle-body speed is made to follow the target vehicle-body speed by controlling the acceleration/deceleration value so that uncomfortable feeling which is caused by an abrupt acceleration, an abrupt deceleration and the like can be reduced.

③ In the vehicle control apparatus mentioned in the above configuration ②, the control unit 32 is configured to increase the engine torque (driving force of the driving-force generating section), if the state where the actual vehicle-body speed V0 is lower than or equal to the last-time-around vehicle-body speed V0_z1 has continued for the predetermined duration time T1 after the accelerator-manipulation variation-amount calculating section 32b determined that the detected accelerator manipulated amount became larger than or equal to the last-time-around accelerator manipulated amount. Thus, by detecting an upslope/over-bump-running scene, an appropriate running-speed control for vehicle can be performed.

④ In the vehicle control apparatus mentioned in the above configuration ③, the control unit 32 is configured to increase the engine torque (the driving force of driving-force generating section) by a larger amount in a case where the actual vehicle-body speed V0 is equal to 0 as compared with a case where the actual vehicle-body speed V0 is greater than 0, if the state where the actual vehicle-body speed V0 is lower than or equal to the last-time-around vehicle-body speed V0_z1 has continued for the predetermined duration time T1 after the accelerator-manipulation variation-amount calculating section 32b determined that the accelerator manipulated amount became larger than or equal to the last-time-around accelerator manipulated amount. Therefore, a bump run-over scene can be detected, and a vehicle running-speed control appropriate for the bump can be performed.

⑤ In the vehicle control apparatus mentioned in the above configuration ④, the control unit 32 increases the engine torque (the driving force of driving-force generating section) and then causes the hydraulic unit 31 and the wheel cylinder W/C (the braking-force generating section) to reduce the vehicle-body speed irrespective of the accelerator manipulated amount when the actual vehicle-body speed V0 becomes other than 0 because of the increase of engine torque, if the state where the actual vehicle-body speed V0 is lower than or equal to the last-time-around vehicle-body speed V0_z1 has continued for the predetermined duration time T1 after the accelerator-manipulation variation-amount calculating section 32b determined that the accelerator manipulated amount became larger than or equal to the last-time-around accelerator manipulated amount and if the actual vehicle-body speed V0 is equal to 0. Therefore, an unnecessary popping-out (sudden forth movement) of vehicle can be prevented after running over the bump.

⑥ The vehicle control apparatus mentioned in the above configuration ① further includes a road-surface friction coefficient detecting section (step S91) for detecting a friction coefficient of road surface on which the vehicle is running. The control unit 32 is configured to set the control gain for generating the braking/driving force at a larger value in a case where the detected road-surface friction coefficient is higher than a predetermined value, as compared with a case where the detected road-surface friction coefficient is lower than the predetermined value (see FIG. 7). Therefore, an appropriate braking force/driving force according to the road-surface friction coefficient can be obtained so that the vehicle can be stabilized.

(7) In the vehicle control apparatus mentioned in the above configuration (1), the control unit 32 is configured to cancel the one-pedal running mode (speed control mode) and carry out the normal control mode, when a predetermined condition is satisfied under a state where the one-pedal running mode is being selected. Thus, by canceling the one-pedal running mode as needed basis, a convenience (user-friendliness) is improved without imposing a manipulation burden on the driver.

(8) The vehicle control apparatus mentioned in the above configuration (7) further includes the brake switch 38 (brake-manipulated-state detecting section) for detecting the brake manipulated state of driver. The above-mentioned predetermined condition is satisfied by a requirement that the brake switch 38 becomes in ON status (i.e., when the brake-manipulated-state detecting section detects an actual brake manipulation of the driver). Thus, by giving a priority to the braking intention of driver, a safety can be enhanced.

(9) In the vehicle control apparatus mentioned in the above configuration (7), the predetermined condition is satisfied by a requirement that the calculated actual vehicle-body speed V0 is higher than the predetermined vehicle-body speed V1. That is, the one-pedal running mode is carried out only in the low-speed region and is not used in the high-speed region. Thus, the one-pedal running mode can be cancelled as needed basis so that the convenience can be improved.

(10) The vehicle control apparatus mentioned in the above configuration (7) further includes the steering angle sensor 34 (steering-state detecting section) configured to detect a steering state of the driver. The above-mentioned predetermined condition is satisfied by a requirement that the steering angle sensor 34 detects an actual steering of the driver. That is, the control of one-pedal running mode is not carried out during the steering. Thus, the one-pedal running mode can be cancelled as needed basis so that the convenience is improved.

(11) The vehicle control apparatus according to the first embodiment includes the accelerator opening sensor 37 (accelerator manipulated-state detecting section) configured to detect the manipulated state of accelerator by a driver; the hydraulic unit 31 and the wheel cylinder W/C (deceleration unit) configured to reduce the speed of vehicle; and the control unit 32. This control unit 32 includes the actual vehicle-body speed calculating section 32a (vehicle speed calculating section) configured to calculate the speed of vehicle, and a one-pedal-running-mode executing section (speed control section) configured to set the target vehicle speed Vm based on the detected accelerator manipulated state and the calculated vehicle speed, and configured to control the hydraulic unit 31 and the wheel cylinder W/C so as to bring the vehicle speed closer to the set target vehicle speed Vm. Therefore, since a proper speed control of vehicle can be conducted by only the accelerator manipulation, the driving-manipulation burden of driver can be reduced.

(12) The vehicle control apparatus mentioned in the above configuration (11) further includes the accelerator-manipulation variation-amount calculating section 32b configured to calculate the variation amount of accelerator manipulation per unit time on the basis of the detected accelerator manipulated state, and the engine controller 36 and engine 39 (acceleration unit) configured to increase the vehicle speed. The control unit 32 is configured to set the target deceleration value G1 on the basis of the calculated accelerator-manipulation variation amount and the calculated actual vehicle speed V0 in order to calculate the target vehicle speed Vm, and configured to bring the vehicle speed V0 closer to the calculated target vehicle speed Vm. Thus, the actual vehicle speed can be made to follow the target vehicle speed given by an appropriate acceleration/deceleration value, so that the strangeness feeling of driver can be reduced.

(13) In the vehicle control apparatus mentioned in the above configuration (12), the control unit 32 is configured to increase the engine torque (driving force of the acceleration unit), if the state where the vehicle speed V0 is lower than or equal to the last-time-around vehicle speed V0_z1 has continued for the predetermined duration time T1 after the accelerator-manipulation variation-amount calculating section 32b detected that the accelerator manipulated state became larger than or equal to the last-time-around accelerator manipulated state. Thus, by detecting an upslope/over-bump-running scene, an appropriate running-speed control for vehicle can be performed.

(14) In the vehicle control apparatus mentioned in the above configuration (13), the control unit 32 is configured to increase the engine torque (driving force of the acceleration unit) by a larger amount in a case where the actual vehicle speed V0 is equal to 0 as compared with a case where the actual vehicle speed V0 is greater than 0, if the state where the vehicle speed V0 is lower than or equal to the last-time-around vehicle speed V0_z1 has continued for the predetermined duration time T1 after the accelerator-manipulation variation-amount calculating section 32b detected that the accelerator manipulated state became larger than or equal to the last-time-around accelerator manipulated state. Thus, by detecting a bump running-over scene, a vehicle running-speed control appropriate for the bump can be performed.

(15) In the vehicle control apparatus mentioned in the above configuration (14), the control unit 32 increases the engine torque (driving force of the acceleration unit) and then causes the hydraulic unit 31 and wheel cylinder W/C (deceleration unit) to reduce the actual vehicle speed V0 irrespective of the detected accelerator manipulated state is when the actual vehicle speed V0 becomes other than 0 (V0≠0) because of the increase of engine torque, if the state where the vehicle speed V0 is lower than or equal to the last-time-around vehicle speed V0_z1 has continued for the predetermined duration time T1 after the accelerator-manipulation variation-amount calculating section 32b detected that the accelerator manipulated state became larger than or equal to the last-time-around accelerator manipulated state and if the actual vehicle speed V0 is equal to 0. Therefore, an unnecessary popping-out (sudden forth movement) of vehicle can be avoided after running over the bump.

(16) In the vehicle control apparatus mentioned in the above configuration (12), the control unit 32 further includes a normal-control-mode executing section (normal control section) configured to cause the engine controller 36 and the engine 39 to generate an engine torque (driving force) corresponding to the detected accelerator manipulated state. The vehicle control apparatus further includes the one-pedal-running-mode changeover switch 41 (selecting switch) configured to select between the one-pedal running mode (speed control section) and the normal control mode (normal control section). Moreover, the control unit 32 is configured to control the vehicle by using the selected one of the speed control section and the normal control section, and configured to change the speed control section to the normal control section when a predetermined condition is satisfied under a state where the speed control section is being selected. Thus, by canceling the one-pedal running mode (speed control section) as needed basis, the convenience can be enhanced.

(17) The vehicle control apparatus mentioned in the above configuration (16) further includes the brake switch 38 (brake-manipulated-state detecting section) configured to detect the brake manipulated state of the driver; and the predetermined condition is satisfied by a requirement that the brake switch 38 detects an actual brake manipulation of the driver. Therefore, a priority can be given to the braking intention of driver, so that the safety can be enhanced.

(18) In the vehicle control apparatus mentioned in the above configuration (17), the predetermined condition is satisfied by a requirement that the calculated actual vehicle speed V0 is higher than the predetermined vehicle speed V1. Therefore, the one-pedal running mode can be cancelled as needed basis so that the convenience can be improved.

(19) The vehicle control apparatus mentioned in the above configuration (18) further includes the steering angle sensor (steering-state detecting section) configured to detect the steering state of driver; and the predetermined condition is satisfied by a requirement that the steering angle sensor 34 detects an actual steering of the driver. Therefore, the speed control mode can be cancelled as needed basis so that the convenience is improved.

(20) The vehicle control method according to the first embodiment includes the steps of providing the one-pedal-running-mode changeover switch 41 (selecting switch) configured to select between the normal control mode and the one-pedal running mode (speed control mode); setting the target vehicle-body speed Vm on the basis of an acceleration/deceleration value corresponding to the accelerator manipulated amount of driver; and controlling the braking/driving force of vehicle so as to achieve the set target vehicle-body speed Vm, when the driver is selecting the one-pedal running mode (speed control mode). Therefore, the vehicle can be controlled in dependence upon the driver's intention. When the speed control mode is being selected, the vehicle speed can be controlled only by the accelerator manipulation so that the driving burden to the driver can be reduced.

Other Embodiments

Although the present invention has been described above with reference to the first embodiment of the present invention, the present invention is not limited to the embodiments described above. Modifications and variations of the embodiments described above will occur to those skilled in the art in light of the above teachings.

For example, although both of the acceleration control and deceleration control are performed in the structure in the first embodiment, only the deceleration control may be performed according to the present invention.

Moreover, the accelerator opening sensor is used as the accelerator-manipulated-amount detecting section in the first embodiment. However, according to the present invention, the other means for detecting an acceleration intention of the driver may be appropriately used as this accelerator-manipulated-amount detecting section. Moreover, the brake switch is used as the brake-manipulated-state detecting section. However, according to the present invention, the manipulated state of brake may be detected by a master-cylinder fluid-pressure sensor, a wheel-cylinder fluid-pressure sensor, a brake-pedal stroke sensor or a pedal-pressure sensor. Moreover, the engine torque and the brake fluid pressure are controlled in order to control the braking/driving force of vehicle in the first embodiment. However, according to the present invention, the braking/driving force may be controlled by controlling a transmission ratio (speed ratio) of the transmission or the like. Moreover, the above-mentioned normal control mode includes the antiskid brake system (ABS), the vehicle behavior stabilization control (VDC), the adaptive cruise control and the like in the first embodiment. However, according to the present invention, the normal control mode may include one of these controls or any combination among these controls. Moreover, the one-pedal-running-mode changeover switch which is operated by the driver is provided as the selecting switch for the control mode of vehicle in the first embodiment. However, according to the present invention, the control mode of vehicle may be changed by the other conditions such as information of navigation system and information of Vehicle Information Communication System (VICS), instead of the switch.

Moreover, the target vehicle-body speed Vm is set based on the setting of target deceleration value G1 when the one-pedal running mode is carried out, in the first embodiment. However, according to the present invention, the target vehicle-body speed Vm may be simply set without setting the target deceleration value G1. Moreover, the vehicle equipped with the engine as its drive source has been explained in the first embodiment. However, the present invention is also applicable to an electric vehicle or a hybrid vehicle that is equipped with an electric motor as its drive source or braking-force generation source. In such a case, braking force can be produced also by a regenerative torque control of electric motor or the like, in addition to the brake fluid-pressure control as a deceleration system. Moreover, the control gain is set at a value selected between the gain value for a road having a high road-surface friction coefficient and the gain value for a road having a low road-surface friction coefficient in the first embodiment. However, according to the present invention, the control gain may be set at a value selected from a plurality of gain values in accordance with the magnitude of road-surface friction coefficient $\mu$ or may be set at a value derived from a continuous characteristic provided according to the magnitude of road-surface friction coefficient $\mu$.

This application is based on prior Japanese Patent Application No. 2009-215567 filed on Sep. 17, 2009. The entire contents of this Japanese Patent Application are hereby incorporated by reference.

The scope of the invention is defined with reference to the following claims.

What is claimed is:

1. A vehicle control apparatus comprising:
   an accelerator-manipulated-amount detecting section configured to detect a manipulated amount of an accelerator by a driver;
   a braking-force generating section configured to generate a braking force of the vehicle;
   a driving-force generating section configured to generate a driving force of the vehicle;
   a control unit including a vehicle-body speed calculating section configured to calculate an actual vehicle-body speed of the vehicle, and an accelerator-manipulation variation-amount calculating section configured to calculate a variation amount of accelerator manipulation per unit time on the basis of the manipulated amount of accelerator detected by the accelerator-manipulated-amount detecting section, wherein the control unit is configured to perform a normal control mode which generates a driving force corresponding to the manipulated amount of accelerator, and to perform a speed control mode which calculates a target vehicle-body speed based on the variation amount of the accelerator manipulation and which controls the braking-force generating section and the driving-force generating section so as to bring the actual vehicle-body speed closer to the target vehicle-body speed; and a selecting switch configured to select between the normal control mode and the speed control mode, wherein the control unit is configured to control the vehicle by one selected between the normal control mode and the speed control mode by the selecting switch.

2. The vehicle control apparatus as claimed in claim 1, wherein the control unit includes a target acceleration/deceleration-value calculating section configured to calculate a target acceleration/deceleration value on the basis of the calculated accelerator-manipulation variation amount and the calculated actual vehicle-body speed; and wherein the control unit is configured to calculate the target vehicle-body speed from the calculated target acceleration/deceleration value, and to bring the actual vehicle-body speed closer to the calculated target vehicle-body speed.

3. The vehicle control apparatus as claimed in claim 2, wherein the control unit is configured to increase a driving force of the driving-force generating section, if a state where the actual vehicle-body speed is lower than or equal to a last-time-around vehicle-body speed has continued for a predetermined duration time after the accelerator-manipulation variation-amount calculating section determined that the detected accelerator manipulated amount became larger than or equal to a last-time-around accelerator manipulated amount.

4. The vehicle control apparatus as claimed in claim 3, wherein the control unit is configured to increase the driving force of the driving-force generating section by a larger amount in a case where the actual vehicle-body speed is equal to 0 as compared with a case where the actual vehicle-body speed is greater than 0, if the state where the actual vehicle-body speed is lower than or equal to the last-time-around vehicle-body speed has continued for the predetermined duration time after the accelerator-manipulation variation-amount calculating section determined that the accelerator manipulated amount became larger than or equal to the last-time-around accelerator manipulated amount.

5. The vehicle control apparatus as claimed in claim 4, wherein the control unit increases the driving force of the driving-force generating section and then causes the braking-force generating section to reduce the vehicle-body speed irrespective of the accelerator manipulated amount when the actual vehicle-body speed becomes other than 0 because of the increase of driving force, if the state where the actual vehicle-body speed is lower than or equal to the last-time-around vehicle-body speed has continued for the predetermined duration time after the accelerator-manipulation variation-amount calculating section determined that the accelerator manipulated amount became larger than or equal to the last-time-around accelerator manipulated amount and if the actual vehicle-body speed is equal to 0.

6. The vehicle control apparatus as claimed in claim 1, wherein the control unit is configured to cancel the speed control mode and carry out the normal control mode, when a predetermined condition is satisfied under a state where the speed control mode is being selected.

7. The vehicle control apparatus as claimed in claim 6, wherein the vehicle control apparatus further comprises a brake-manipulated-state detecting section configured to detect a brake manipulated state of the driver; and the predetermined condition is satisfied by a requirement that the brake-manipulated-state detecting section detects an actual brake manipulation of the driver.

8. The vehicle control apparatus as claimed in claim 6, wherein the predetermined condition is satisfied by a requirement that the calculated actual vehicle-body speed is higher than a predetermined vehicle-body speed.

9. The vehicle control apparatus as claimed in claim 6, wherein the vehicle control apparatus further comprises a steering-state detecting section configured to detect a steering state of the driver; and the predetermined condition is satisfied by a requirement that the steering-state detecting section detects an actual steering of the driver.

10. A vehicle control apparatus comprising:

an accelerator-manipulated-amount detecting section configured to detect a manipulated amount of accelerator by a driver;

a braking-force generating section configured to generate a braking force of the vehicle;

a driving-force generating section configured to generate a driving force of the vehicle;

a control unit including a vehicle-body speed calculating section configured to calculate an actual vehicle-body speed of the vehicle, the control unit being configured to perform a normal control mode which generates a driving force corresponding to the manipulated amount of accelerator, and to perform a speed control mode which calculates a target vehicle-body speed based on the manipulated amount of accelerator and which controls the braking-force generating section and the driving-force generating section so as to bring the actual vehicle-body speed closer to the target vehicle-body speed;

a selecting switch configured to select between the normal control mode and the speed control mode, wherein the control unit is configured to control the vehicle by one selected between the normal control mode and the speed control mode by the selecting switch; and wherein the vehicle control apparatus further comprises a road-surface friction coefficient detecting section configured to detect a friction coefficient of road surface on which the vehicle is running; and wherein the control unit is configured to set a control gain for generating the braking/driving force at a larger value in a case where the detected road-surface friction coefficient is higher than a predetermined value, as compared with a case where the detected road-surface friction coefficient is lower than the predetermined value.

11. A vehicle control method comprising:

providing a selecting switch configured to select between a normal control mode and a speed control mode;

detecting an accelerator manipulated amount of an accelerator that is manipulated by a driver;

calculating a variation amount of accelerator manipulation per unit time on the basis of the accelerator manipulated amount;

setting a target vehicle-body speed on the basis of an acceleration/deceleration value corresponding to the variation amount of accelerator manipulation; and controlling a braking/driving force of a vehicle so as to achieve the set target vehicle-body speed, when the driver is selecting the speed control mode.

* * * * *